Oct. 20, 1936.  H. KUPPENBENDER  2,058,086
PHOTOGRAPHIC CAMERA
Filed May 31, 1935   2 Sheets-Sheet 1
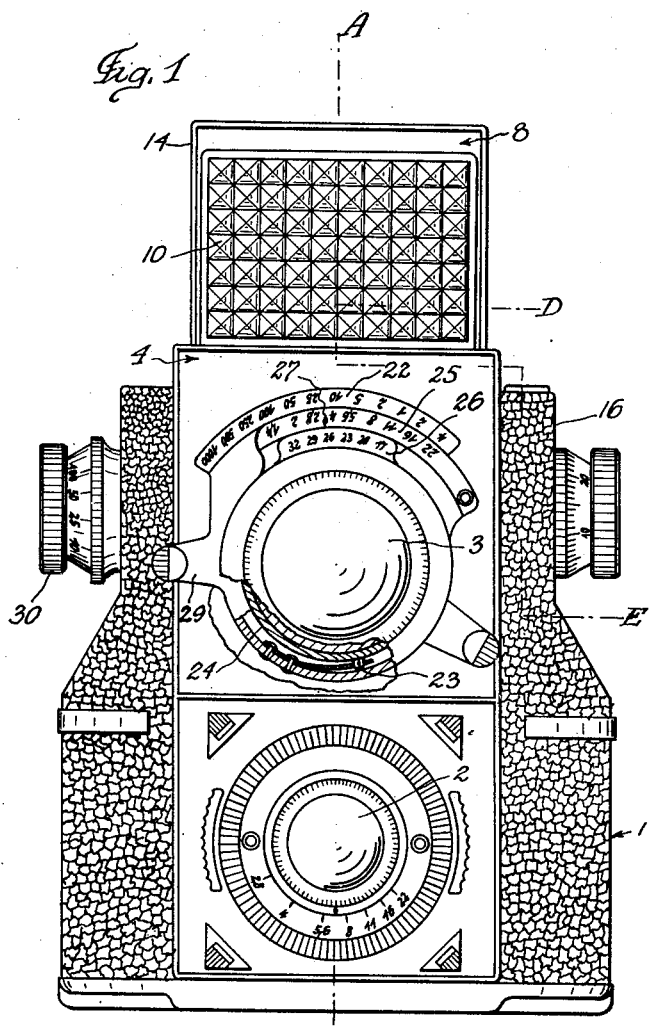
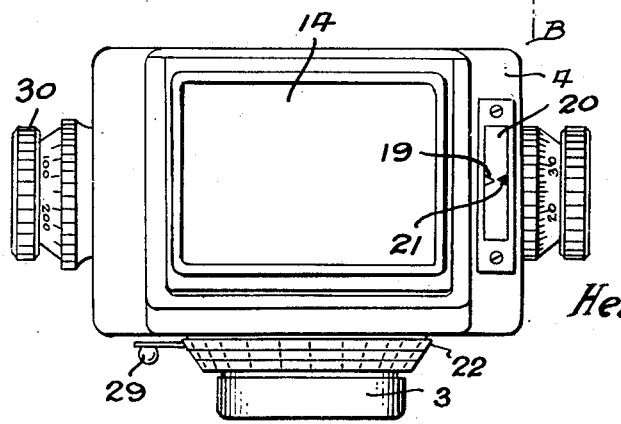
Inventor
Heinz Küppenbender
by B. Singley
Att'y Oct. 20, 1936.  H. KUPPENBENDER  2,058,086
PHOTOGRAPHIC CAMERA
Filed May 31, 1935  2 Sheets-Sheet 2
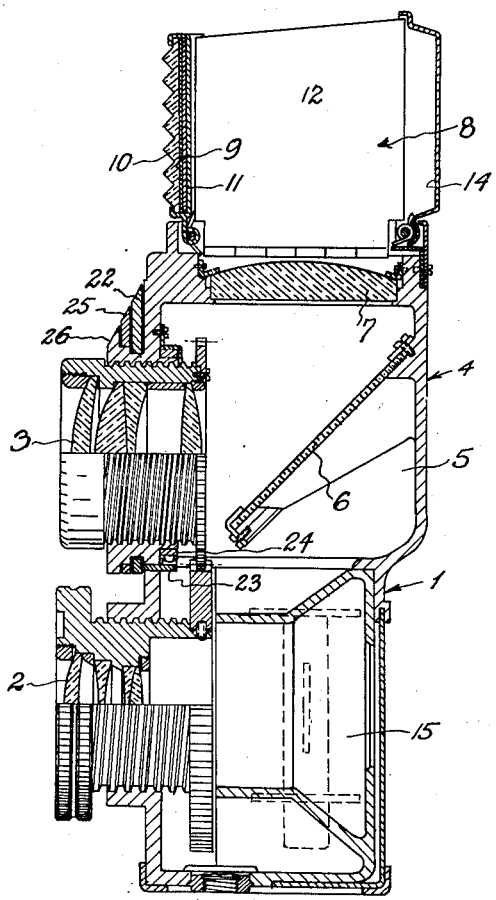
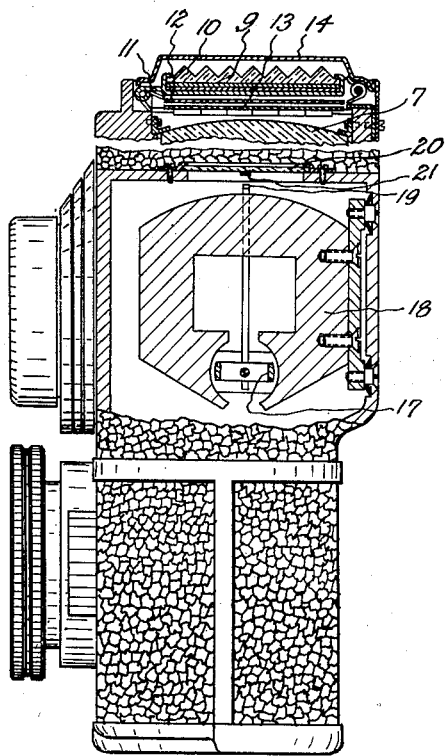
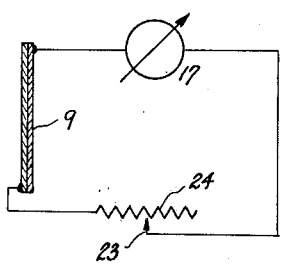
Inventor
Heinz Küppenbender Patented Oct. 20, 1936

2,058,086

UNITED STATES PATENT OFFICE 2,058,086

PHOTOGRAPHIC CAMERA

Heinz Kuppenbender, Dresden-A, Germany, assignor to Zeiss Ikon Aktiengesellschaft, Dresden, Germany Application May 31, 1935, Serial No. 24,290
In Germany June 1, 1934

12 Claims. (Cl. 88—23)

This invention relates to improvements in photographic cameras. It applies primarily to that type of cameras in which a finder forming part of the camera projects the scene to be photographed upon a mirror, from which it is reflected on a lens or plate partly enclosed by a hood to facilitate observation.

An object of the invention is to utilize a movable part of the finder structure, as for instance a portion of the collapsible hood, as a support for an exposure meter.

Another object of the invention is to utilize a portion of the collapsible hood as a guard for the exposure meter when the exposure meter is not in use.

The invention also has the object of providing a finder structure for a camera wherein instrumentalities operative upon use of the exposure meter are permanently located, so as to render the combined finder, exposure meter and protective hood extremely compendious and light in weight.

It is, furthermore, an object of the invention to provide a camera with a collapsible hood and with an exposure meter wherein upon moving the hood to operative position for viewing the finder image the exposure meter is simultaneously placed in position to respond to the light reflected from the object to be photographed.

Another object of the invention is to provide in combination with a finder having a screen, lens or plate upon which the finder image can be seen, an exposure meter the adjustment of which takes place in dependence on the strength of light reflected from the object and to permit the observation of the effect of this adjustment in a plane parallel to that of the screen, lens or plate of the finder, to obviate the necessity of having to observe conditions in angularly related planes.

Other objects will become apparent from the following specification and from the claims appended thereto. In the specification, reference is made to the accompanying drawings, wherein:

Fig. 1 shows a front elevation of a camera with a finder and exposure meter of this type;

Fig. 2 is a vertical section on line A—B of Fig. 1;

Fig. 3 is a fragmentary section vertical on line D, E, and partly elevational, the hood being shown collapsed;

Fig. 4 shows a wiring diagram for the adjustable photometer, which is used to determine the exposure.

Fig. 5 is a top view of the camera, with the hood collapsed.

The photographic camera 1 is equipped with a lens system 2 through which the picture is to be taken. The lens mounting is united with that of the lens 3 of the finder 4, to permit of simultaneous adjustment of both lenses.

This finder comprises a housing 5, provided with a mirror 6, presenting a reflecting surface at 45°. In its top wall the finder housing 5 carries a plane convex lens 7 which may be slightly frosted on its lower face, and which constitutes the viewing element of the finder. In this manner it is possible to view the object or article to be photographed from above said lens 7. A hood 8 to facilitate the observation of the image reflected by the mirror 6 is mounted on top of the housing 5, and this hood is collapsible.

The light sensitive element of an electric exposure meter is secured to the hood. The exposure meter comprises a source of electric energy in form of a photoelectric cell or pyle 9, and a transparent plate 10 in front of said cell 9, and having prismatic projections. This prismatic arrangement has the effect of directing solely the light reflected by the object to be photographed upon the cell 9, while the light emanating from other points remote from the object, particularly the light from the sky, absorbed by the base surface of the prismatic projections. When the hood 8 is to be folded down, the wall 11 carrying the photoelectric cell 9 and plate 10 is positioned above two other walls 12, 13, which also are moved to collapsed position. The wall 14 forming the rear closure of the hood then forms a top closure over the prismatic plate 10, Fig. 3. In this manner the photoelectric cell 9 and the prismatic plate 10 are protected against injuries.

The arrangement and the operation of the exposure meter and finder is as follows:

The camera housing 15 supports the finder housing 5 having a compartment in which the reflecting mirror 6 is mounted. Laterally of this space for the reflecting mirror 6, a narrow extension 16 contains the adjusting mechanism for the exposure meter. This adjusting mechanism comprises a coil 17 of fine wire rotatably mounted between the pole shoes of a magnet 18. The position of a pointer 19 carried by coil 17 may be observed through a glass plate 20 laterally of the hood, and approximately in the same plane as the lens or screen 7 of the finder. The glass plate 20 carries an indicating mark 21 at a fixed point.

The proper exposure time is ascertained by current generated by the cell 9, until the pointer 19 of coil 17 is in opposition to the index 21. For this purpose, a dial 22 rotatably positioned about the lens 3 of the finder is turned; this dial carries a wiping contact 23 which slides over an electric resistance 24 in the circuit of the photo-excited cell 9. Two other dials 25 and 26 are mounted in concentric relation to the dial 16. The dial 25 is freely rotatable on this mounting and carries indications of diaphragm values. It also is provided with an index mark 27. The dial 26 is fixedly held on the camera and shows the degrees of sensitiveness (Scheiner degrees) of the film. This resistance is shown as a coil of fine wire concentric to the lens mounting and supported thereon.

Fig. 4 shows a wiring diagram of the photo meter described. The photoelectric cell 9 is serially connected with the coil 17 of the adjusting instrument and with the resistance 23. The coil 17 is in serial connection with the sliding contact 25 which cooperates with the resistance 24.

To ascertain the proper exposure time, the following steps are observed. The dial 25 is adjusted so as to bring its index 27 into opposition to that Scheiner degree indication on dial 26, wihch represents the sensitiveness of the used film. The lever 29, Fig. 1, is then operated to turn the exposure dial 22, and hence also moves the slide contact 23 traveling about the resistance 24, while in engagement with the same, so as to vary thereby the resistance in the circuit. When the pointer 19 of the adjusting coil 17 is in opposition to the index mark 21 which can be observed from above on window 20, the exposure time may be calculated from the two dials 22 and 25. To every diaphragm value, as readable on the dial 25, a certain exposure time value on the dial 22 corresponds. The shutter may be set to any desired value by turning the button 30, which in Fig. 1 is shown as projecting laterally from the wall of the camera.

I claim:

1. A finder for photographic cameras, comprising a housing, a mirror in the housing, a viewing element in the top wall of the housing and in the path of the light reflected from the mirror, a collapsible hood for the viewing element mounted upon the top wall of the housing, and an electric exposure meter including a photo electric cell, said cell being mounted upon a portion of said collapsible hood, said hood having a portion adapted to be folded upon that portion which is provided with said photo electric cell when the hood is collapsed.

2. A photographic camera finder comprising a housing, a mirror in the housing, a viewing element in the top wall of the housing, a collapsible hood having a plurality of walls foldable towards the housing and projecting in operative condition above the viewing element in the top wall, one of said foldable walls facing in its extended position the object to be photographed, and an electric exposure meter provided with a photo electric cell, said cell being mounted on that wall of the hood which in its extended position faces the object to be photographed.

3. A photographic camera finder comprising a housing, a mirror in said housing, a viewing element in the top wall of the housing, a collapsible hood having a front wall foldable towards and away from the top wall of said housing, and additional walls foldable relatively to the top wall of said housing, an electric exposure meter provided with a photo electric cell, said cell being mounted on the front wall of the hood with another wall of the hood foldable over said front wall when the hood is in collapsed condition.

4. A photographic camera finder, having a housing, a mirror in said housing, a viewing element in the top wall of the housing and in the path of rays of light reflected from the mirror, a collapsible hood on the top of the housing and above the viewing element, and an electric exposure meter including a photoelectric cell, said cell being mounted upon a portion of said hood which faces the object to be photographed when the hood is in extended position.

5. A photographic camera finder having a housing, a mirror in the same, a viewing element in the path of rays of light reflected from the mirror, a collapsible hood mounted upon the housing, an electric exposure meter including a cell adapted to be energized by light striking said cell, the cell being fixedly mounted upon a portion of said collapsible hood above said viewing element.

6. A photographic camera finder, comprising a housing, a mirror in said housing, a viewing element in the path of rays of light reflected from the mirror, a collapsible hood on the housing above said viewing element, and an electric exposure meter including a cell adapted to be energized by light and a transparent prismatic plate overlying said cell, said cell and plate being mounted on said hood.

7. A photographic camera finder comprising a housing, a mirror in the housing, a viewing element in the path of rays of light reflected from the mirror, a collapsible hood on the top of the housing above the viewing element, said viewing element being in the plane of the top wall of the housing, and an electric exposure meter including a cell adapted to generate an electromotive force when energized by light, said cell being mounted upon said hood, an element movable within the housing and controlled by the current generated by said cell, and means accessible to observation from the top wall of the housing for indicating the position of said movable element.

8. A photographic camera finder comprising a mirror, a viewing element in the path of rays of light reflected by the mirror, a housing for said mirror, the viewing element being located in a wall of said housing, a hood movably secured to said wall and adapted to be collapsed over said viewing element, an electric exposure meter including a cell adapted to generate electromotive force when energized by light, said cell being mounted upon said hood an electric circuit connected with said cell, a movable element in said circuit, the movement of which is controlled by the intensity of the current in the circuit, and means in the wall in which said viewing element is located for indicating the position of said movable element.

9. A photographic camera finder, including a mirror, a viewing element, a housing for said mirror and viewing element, the viewing element being in a wall of said housing, a collapsible hood for said viewing element, an exposure meter including an electric cell adapted to generate an electromotive force when energized by light, said cell being mounted upon said hood, means on the finder for adjusting the strength of the current in the circuit connected with said cell, and means in the wall of the housing in which the viewing element is located for indicating the adjustment of said circuit.

10. In a photographic camera, the combination with a finder of an electric exposure meter, said finder being arranged above said camera and including a housing, a mirror within said housing, a viewing element in the path of the rays reflected by said mirror, and a collapsible hood mounted upon said housing and extending above said viewing element; said electric exposure meter including a light sensitive cell mounted upon a section of said hood and adapted to generate an electric current when energized by light, means for adjusting said electric current, and movable means controlled by said electric current arranged in said housing, said movable means being visible from the outside of said housing.

11. In a photographic camera, the combination with a finder of an electric exposure meter, said finder being arranged above said camera and including a housing, a mirror within said housing, a viewing element in the top wall of said housing and in the path of the rays reflected by said mirror, and a collapsible hood mounted upon said housing and extending above said viewing element; said electric exposure meter including a light sensitive cell mounted upon a section of said hood in a position to be energized by the light rays reflected from the object to be photographed when the hood is in extended position to generate an electric current, means for adjusting said electric current, movable means in said housing responsive to said electric current, and means in said top wall of said housing and adjacent said viewing element for rendering said movable means visible from the outside of said housing.

12. A photographic camera finder comprising a housing, a mirror in the housing, a viewing element in the top wall of the housing, a collapsible hood having a plurality of walls foldable towards the housing and projecting in operative condition above the viewing element in the top wall, one of said foldable walls facing in its extended position the object to be photographed, and an electric exposure meter provided with a photo electric cell, said cell being mounted upon that wall of the hood, which in its extended position faces the object to be photographed, and adjustment means for said exposure meter arranged in said housing.

HEINZ KUPPENBENDER.